(12) United States Patent
Leigh et al.

(10) Patent No.: US 10,725,251 B2
(45) Date of Patent: Jul. 28, 2020

(54) CABLE ROUTER

(71) Applicant: Hewlett Packard Enterprise Development LP, Houston, TX (US)

(72) Inventors: Kevin B. Leigh, Houston, TX (US); Sunil Rao Ganta Papa Rao Bala, Cypress, TX (US); John Grady, Cypress, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/885,268

(22) Filed: Jan. 31, 2018

(65) Prior Publication Data

US 2019/0235185 A1 Aug. 1, 2019

(51) Int. Cl.
| | |
|---|---|
| *G02B 6/38* | (2006.01) |
| *H04L 12/761* | (2013.01) |
| *H04L 12/773* | (2013.01) |
| *H04Q 1/06* | (2006.01) |
| *H04L 12/46* | (2006.01) |
| *H04Q 11/00* | (2006.01) |

(52) U.S. Cl.
CPC ............ *G02B 6/3897* (2013.01); *H04L 12/46* (2013.01); *H04L 45/16* (2013.01); *H04L 45/60* (2013.01); *H04Q 1/06* (2013.01); *H04Q 2011/0039* (2013.01); *H04Q 2011/0058* (2013.01)

(58) Field of Classification Search
CPC ......... H04L 45/60; H04L 45/16; H04L 12/46; G02B 6/3897; H04Q 1/06
See application file for complete search history.

(56) References Cited

U.S. PATENT DOCUMENTS

| | | | |
|---|---|---|---|
| 5,216,579 A | 6/1993 | Basara et al. | |
| 7,097,047 B2 | 8/2006 | Lee et al. | |
| 7,950,244 B2 | 5/2011 | Iyengar et al. | |
| 8,282,451 B2 | 10/2012 | Taylor | |
| 9,459,426 B2 | 10/2016 | Leigh et al. | |
| 9,877,407 B1 * | 1/2018 | Sim ........................ | H05K 7/186 |
| 9,888,603 B1 * | 2/2018 | Vargas .................... | H05K 7/14 |
| 10,048,452 B1 * | 8/2018 | Hangebrauck ....... | G02B 6/3894 |
| 2008/0237408 A1 * | 10/2008 | McClellan ............... | H04Q 1/06 |
| | | | 248/68.1 |
| 2011/0228473 A1 * | 9/2011 | Anderson ............ | G02B 6/4452 |
| | | | 361/679.58 |
| 2014/0131527 A1 * | 5/2014 | Rudenick ............. | G02B 6/4479 |
| | | | 248/74.1 |

(Continued)

FOREIGN PATENT DOCUMENTS

WO    WO-2016114791    7/2016

*Primary Examiner* — Thomas A Hollweg
*Assistant Examiner* — Mary A El-Shammaa
(74) *Attorney, Agent, or Firm* — Trop, Pruner & Hu PC

(57) ABSTRACT

An optical cable router is disclosed. The optical cable router is to couple to rocker-arm plenums of a modular computing system. The optical cable router includes a crossbar that includes an optical cable cavity. The optical cable cavity has a plurality of optical cables and an access panel. The optical cable router further includes optical connectors, each of which is coupled to a respective optical cable of the plurality of optical cables. Each optical connector is also coupled to a respective optical connector of a respective modular computing device retained in the modular computing system.

11 Claims, 13 Drawing Sheets

(56) References Cited

U.S. PATENT DOCUMENTS

| | | | | |
|---|---|---|---|---|
| 2014/0220794 A1* | 8/2014 | Taylor | ............... | H04Q 1/13 |
| | | | | 439/55 |
| 2014/0355943 A1* | 12/2014 | Bradley | ............... | G02B 6/4452 |
| | | | | 385/135 |
| 2015/0063771 A1* | 3/2015 | Mogul | ............... | G02B 6/4452 |
| | | | | 385/135 |
| 2016/0124470 A1 | 5/2016 | Leigh et al. | | |
| 2017/0235072 A1* | 8/2017 | Schuster | ............... | H04Q 1/15 |
| | | | | 398/82 |
| 2017/0257970 A1* | 9/2017 | Alleman | ............... | G06F 1/184 |
| 2018/0026851 A1* | 1/2018 | Adiletta | ............... | H03M 7/40 |
| | | | | 709/222 |
| 2018/0027686 A1* | 1/2018 | Adiletta | ............... | H03M 7/40 |
| | | | | 361/679.48 |
| 2018/0088286 A1* | 3/2018 | Kostecka | ............... | G02B 6/3879 |
| 2018/0188465 A1* | 7/2018 | Zer | ............... | G02B 6/4441 |

\* cited by examiner

CABLE ROUTER

BACKGROUND

Certain types of computing systems are modular. Modular computing devices are retained in slots in the modular computing system and are interconnected with a computing fabric (e.g. an optical interconnection to switches, routers, etc.). In some example modular computing systems, some modular computing devices are retained in a front section of the modular computing system and computing fabric are retained in a rear section of the modular computing system. Each modular computing device is coupled to a midplane in between the front and rear sections of the modular computing system where the connections between the modular computing devices and the midplane are relatively low bandwidth connections due to space limitations.

In certain example modular computing systems, the connections between the modular computing devices and the computing fabric are both installed and connected on the rear of the rack where the full faceplate area of the computing device and computing fabric may be populated with optical connectors for a relatively high bandwidth connection. In some examples, a modular computing system includes multiple frames interconnected with optical interfaces. A modular computing system may include a rocker arm plenum to provide rack-scale high speed optical connectivity between resource devices. In some examples, the rocker-arm plenum conceals and protects optical cables that provide high bandwidth data interconnectivity. In some examples, articulating rocker-arm connectors are pivoted about the rocker-arm plenums on the left and right frame edges of a rack of the modular computing system and couple to the optical receptacle connectors located near the left and right edges of each modular computing device and computing fabric horizontally oriented in a rack, interconnecting the modular computing devices with the computing fabric.

In some examples, some slots in the modular computing system retain quarter-width modular computing devices. Since the rocker-arm connectors are pivoted on the rocker-arm plenums that are affixed to the edges of the rack, the interior quarter-width modular computing devices cannot be coupled to either rocker-arm connector.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which.

Figure 1:
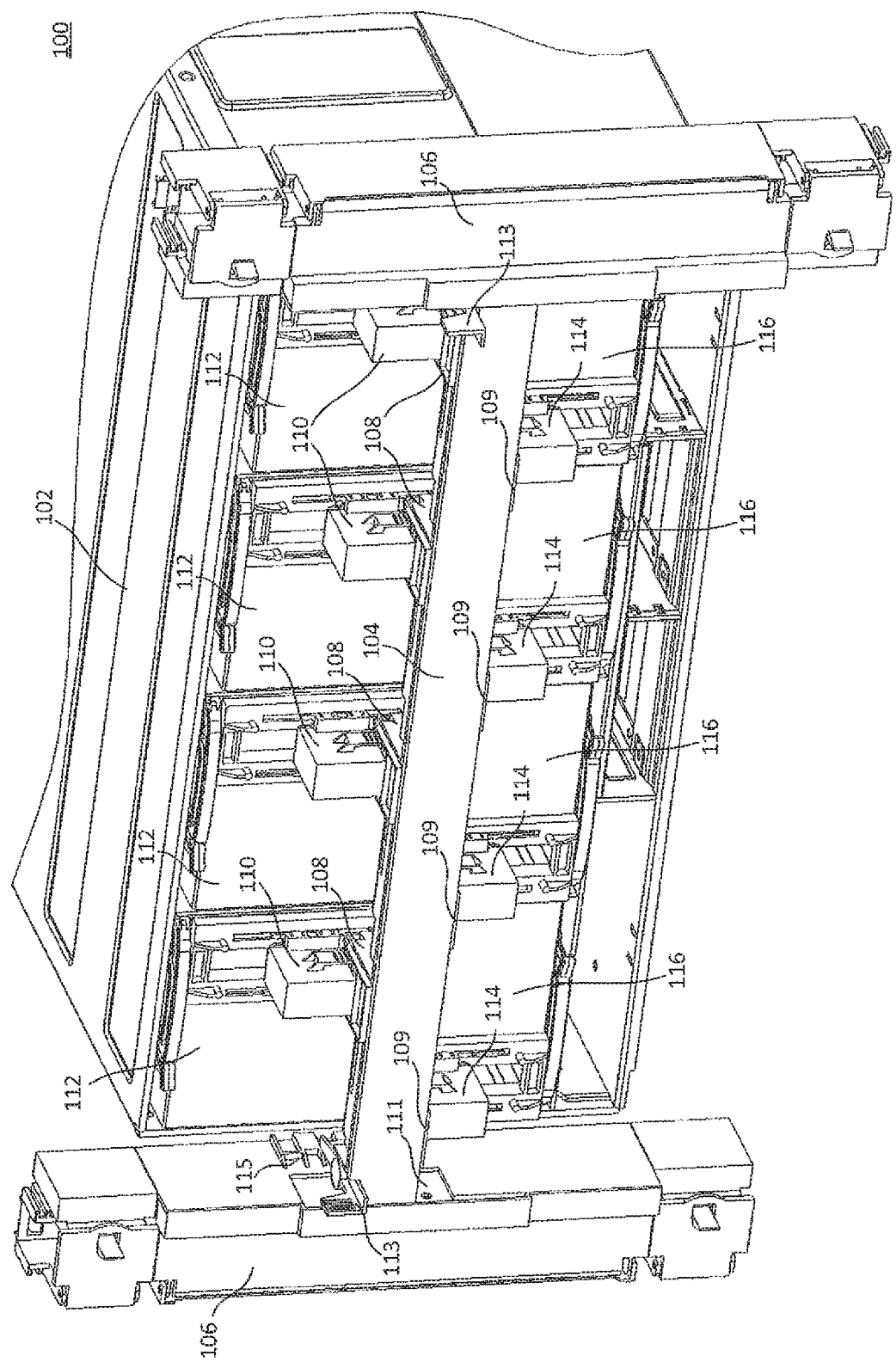
FIG. 1 illustrates an example optical cable router coupled to a modular computing system.

certain examples have features that are in addition to or in lieu of the features illustrated in the above-referenced figures. Certain labels may be omitted from certain figures for the sake of clarity.

DETAILED DESCRIPTION

In some example modular computing systems, certain rows of slots on the rear of the system are split to receive multiple quarter-width (or other partial widths) modular computing devices. In such modular computing systems, rocker-arm plenums run vertically along the rear edges of the rack. The rocker arms of the rocker-arm plenums can rock into place, coupled to optical connectors of the outermost quarter-width devices, but the innermost devices are not reached by any rocker arms.

In certain examples, an optical cable router spans between the rocker-arm plenums with a crossbar and provides optical connectors for the quarter-width devices. In some examples, the optical cable router replaces the rocker arms for that row, and the optical cable router provides optical connectors for all devices of the row.

Often, the rows of slots are vertically arranged so that succeeding rows are adjacent to one another with minimal spacing between the rows. The crossbar, when in a neutral position, may align with the spacing between rows, but may obstruct the modular devices so that they cannot be removed while the crossbar is in place.

In some examples, the crossbar can be moved so that modular devices in the row above or the row below the optical cable router can be removed. This movement also allows new modular devices to be inserted into empty slots in the row above or the row below the optical cable router. The crossbar contains optical cables that are routed to the optical connectors of the optical cable router from the rocker-arm plenum. Such optical cables may be required to flex and move depending on the mode of movement of the crossbar.

The crossbar moves in relation to the optical connectors that are mounted on the respective modular computing devices, where each optical connector is coupled to a respective optical connector of the optical cable router. However, the couplings between optical connectors of the optical cable router and optical connectors of the modular computing devices are not disrupted by motion of the crossbar. In some examples, the optical connectors of the optical cable router move in relation to the crossbar to stay coupled to the optical connectors of the modular computing devices. In some such examples, the optical connectors of the optical cable router slide vertically in relation to the crossbar. In other such examples, the optical connectors of the optical cable router pivot around a lateral axis (e.g. an axis passing lengthwise through the crossbar). In some other examples, the optical connectors of the modular computing devices slide in relation to their respective modular computing devices to retain the connection with the optical connectors of the optical cable router when the optical cable router moves.

This continued coupling allows modular computing devices to be inserted and removed without disrupting additional devices of the modular computing system by requiring them to be powered down and disconnected from the computing fabric. Instead, only the modular computing device to be inserted or removed needs to be prepared (e.g., inserted into or disconnected from the computing fabric), and the crossbar can be moved out of the way to allow insertion or removal of that device.

FIG. 1 illustrates an example modular computing system 100. Modular computing system 100 includes a frame 102 in a rack (not shown), an optical cable router 104, and rocker-arm plenums 106. Optical cable router 104 includes upper optical connectors 108 and lower optical connectors 109. Frame 102 includes top modular computing devices 112 and bottom modular computing devices 116. Bottom modular computing devices 116 may be oriented opposite (e.g. upside-down) with respect to top modular computing devices 112. Top modular computing devices 112 and bottom modular computing devices 116 include device optical connectors 110 and 114, respectively.

Modular computing system 100 includes a rack (not shown) that retains frames 102. Each frame 102 includes slots for retaining modular computing devices. On the rear side of the modular computing system, rocker-arm plenums 106 are attached to the rear edges of the rack. In some examples, rocker-arm plenums 106 extend the entire height of the rack. Certain frames 102 include slots that receive full-width (e.g. entire width of modular computing system 100) modular computing devices or half-width modular computing devices. Certain other frames 102 include slots that receive quarter-width modular computing devices or full- or half-width devices each with multiple optical connectors. In some examples, portions of rocker-arm plenums 106 adjacent to full-width and half-width devices couple to optical connectors of the modular computing devices by rocker arms (not shown) that include complementary optical connectors. However, rocker arms may not reach to quarter-width devices located in the middle of a row of slots. In some examples, portions of rocker-arm plenums 106 adjacent to frames 102 with quarter-width slots may instead include an optical cable router 104 in lieu of rocker arms.

In some examples, optical cable router 104 couples to rocker-arm plenums 106 by plenum couplers 111. Optical cable router 104 may be coupled orthogonally to the rocker-arm plenums 106 such that it is adjacent to slots of frame 102. Optical cable router 104 couples to top modular computing devices 112 and bottom modular computing devices 116 through upper optical connectors 108 and lower optical connectors 109, respectively. Each top modular computing device 112 includes an optical connector 110 that couples with a respective upper optical connector 108 of optical cable router 104. Similarly, each bottom modular computing device 116 includes an optical connector 114 that couples with a respective lower optical connector 109 of optical cable router 104.

Optical cable router 104 moves to allow access to insert and remove modular computing devices 112 and 116 from the slots of frame 102. Due to the thickness of the crossbar of optical cable router 104, portions of modular computing devices 112 and 116 are blocked when optical cable router 104 is in a neutral position. Optical cable router 104 can be moved to three types of positions: upper positions that allow bottom modular computing devices 116 to be inserted and removed, lower positions that allow top modular computing devices 112 to be inserted and removed. In the example of FIG. 1, the crossbar of optical cable router 104 slides vertically and being retained in the lower position to allow access to the top modular computing devices 112. Optical cable router 104 may include crossbar locks 113 that are received in retention grooves 115 of rocker-arm plenums 106 to fix optical cable router 104 in a position.

Figure 2A:
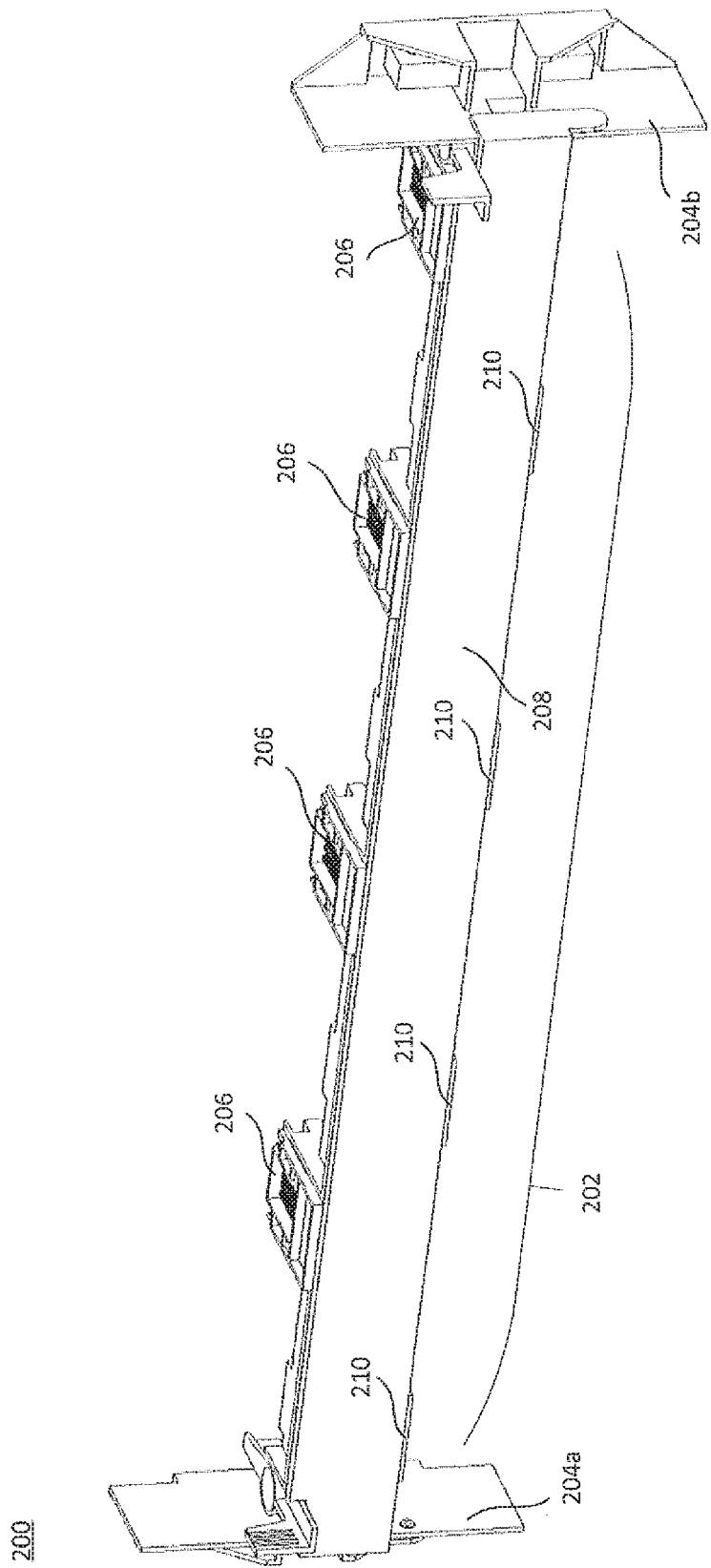
FIG. 2A illustrates an example optical cable router.

FIG. 2A illustrates an example optical cable router 200. Optical cable router 200 includes crossbar 202, plenum couplers 204a and 204b, and optical connectors 206. Crossbar 202 includes an access panel 208. In some examples, crossbar 202 and plenum couplers 204 are a single piece assembly. In this disclosure, the crossbar and the plenum couplers of the optical cable router may be described separately, but this is to facilitate understanding of their different purposes, not necessarily that they are separate pieces.

Optical cable router 200 couples to a modular computing system to provide optical connectivity to modular computing devices with optical connectors near the middle of the rear face of the system, such as partial-width devices and full-width devices with multiple optical connectors. For example, a row of devices may include quarter-width devices, each with a single optical connector, and the interior devices have optical connectors near the middle of the rear face of the system. As another example, a row of devices may include half-width devices, each with two optical connectors, and each device has an optical connector near the middle of the rear face of the system. As yet another example, a row of devices may include a full-width device with four optical connectors, and the device has optical connectors near the middle of the rear face of the system. In the example of FIG. 2A, optical cable router 200 is configured to connect to quarter-width modular computing devices. The modular computing devices may include computing circuitry, memory, storage, fabric, or any combination therein. Optical cable router 200 couples to the modular computing system, spanning the rear of the rack between two rows of slots for modular computing devices. In some examples, the row above optical cable router 200 is a row including slots for retaining quarter-width devices. In certain examples, both the row above optical cable router 200 and the row below optical cable router 200 include slots for retaining quarter-width devices.

Crossbar 202 horizontally spans the width of the rear of the modular computing system, located between two rows of slots for modular computing devices. Crossbar 202 is coupled to plenum coupler 204a on one end and plenum coupler 204b on an opposing end. In some examples, optical cable router 200 is affixed to rocker-arm plenums on rear edges of the rack of the modular computing system, and is not directly affixed to the rack. In some other examples, optical cable router 200 is directly affixed to the rack, either through attachment points on crossbar 202 or through attachment points on plenum couplers 204a and 204b. Crossbar 202 includes an optical cable cavity (obscured by access panel 208) that receives optical cables run between optical connectors 206 and 210 and the rocker-arm plenums. The optical cable cavity is covered by an access panel 208, hiding the optical cables from view and protecting the optical cables.

Plenum couplers 204a-204b couple to rocker-arm plenums located at the rear edges of the modular computing system. In some examples, coupling portions of the rocker-arm plenums are inserted into the rocker-arm plenums to couple with plenum couplers 204a-204b. In some other examples, plenum couplers 204a-204b couple with rocker arm portions of the rocker-arm plenums. Rocker-arm plenums may include complementary access panels that, in conjunction with access panel 208, allow optical cables to be routed through optical cable router 200 and through the rocker-arm plenums to connect optical connectors 206 to the computing fabric.

Coupling plenum couplers 204a-204b to the rocker-arm plenums retains optical cable router 200 in a position relative to the modular computing system between two rows of slots for retaining modular computing devices. Due to the vertical thickness of crossbar 202, the row of slots vertically adjacent and above optical cable router 200 and the row of slots vertically adjacent and below optical cable router 200 may be partially blocked by crossbar 202, resulting in the respective modular computing devices corresponding to those slots prevented from being inserted or removed. Optical cable router 200 may move to allow insertion or removal of those modular computing devices. In some examples, optical cable router 200 either moves in a first manner to allow access to the slots immediately above crossbar 202 or moves in a second manner to allow access to the slots immediately below crossbar 202.

In certain examples, crossbar 202 moves in relation to plenum couplers 204a-204b to allow insertion or removal of the vertically adjacent modular computing devices. In certain examples, crossbar 202 vertically slides in relation to plenum couplers 204a-204b (and in relation to the modular computing system), allowing insertion and removal of either each device of the row of modular computing devices above and adjacent to crossbar 202 or each device of the row of modular computing devices below and adjacent to crossbar 202 depending on the direction of the vertical sliding. In certain other examples, crossbar 202 is shaped so that when it pivots around a lateral axis (running the length of crossbar 202) it allows insertion and removal of either each device of the row of modular computing devices above and adjacent to crossbar 202 or each device of the row of modular computing devices below and adjacent to crossbar 202 depending on the direction of the pivot.

In some other examples, plenum couplers 204a-204b move in relation to the modular computing system or change shape in a way that moves crossbar 202 to allow insertion and removal of either the row of modular computing devices above and adjacent to crossbar 202 or the row of modular computing devices below and adjacent to crossbar 202. For example, plenum couplers 204a-204b may change shape by adjusting telescoping features of plenum couplers 204a-204b to allow crossbar 202 to slide without plenum couplers 204a-204b sliding.

Optical connectors 206 and 210 may remain in fixed positions relative to crossbar 202 while crossbar 202 moves. In some examples, optical connectors 206 and 210 remain in fixed positions relative to their respective modular computing devices, and crossbar 202 moves relative to the plurality of optical connectors 206 and 210. Optical cables within the optical cable cavity of crossbar 202 may flex and move within the optical cable cavity as crossbar 202 moves.

Figure 2B:
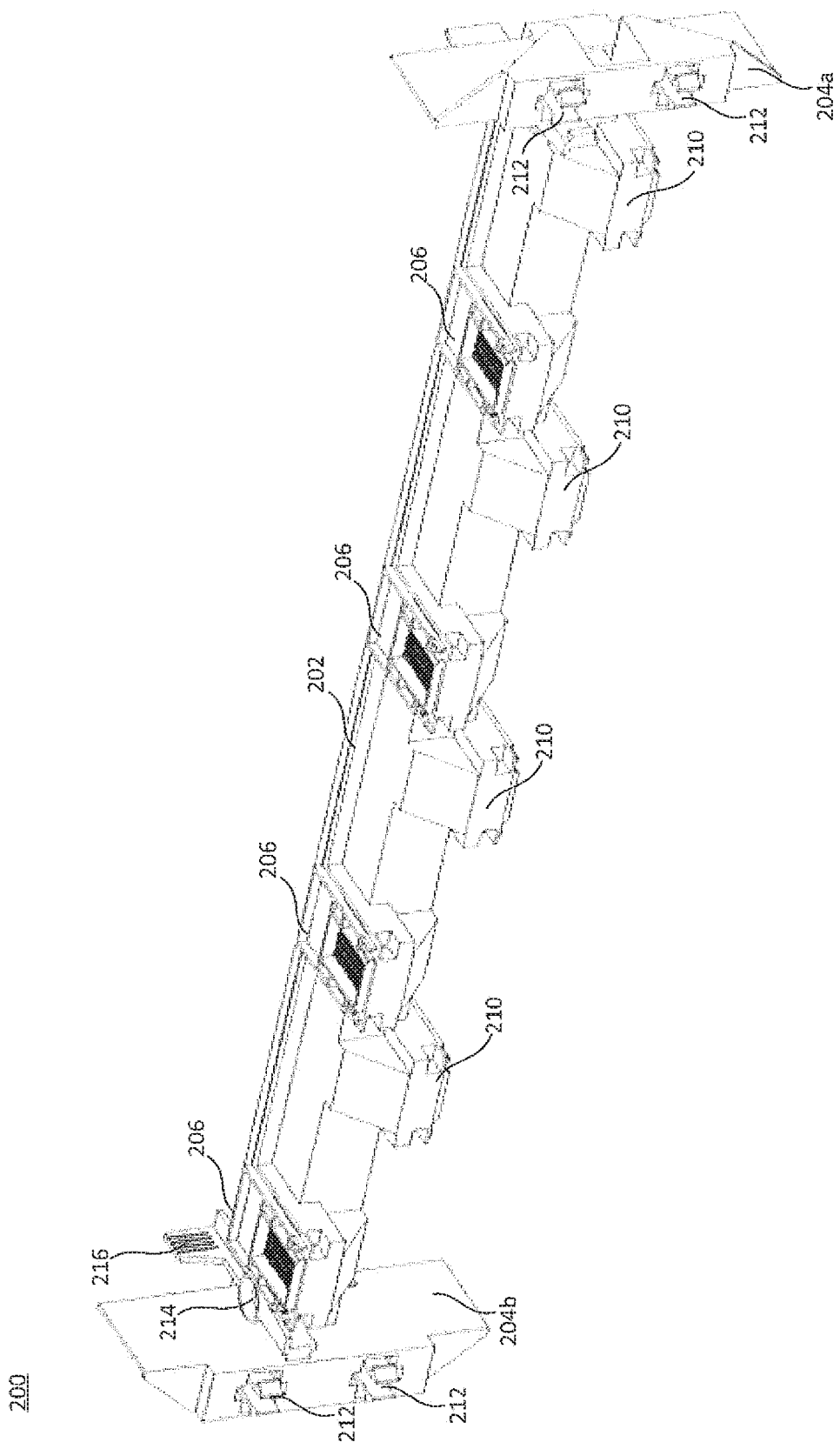
FIG. 2B illustrates another view of an example optical cable router, including optical connectors.

FIG. 2B illustrates another view of example optical cable router 200. In the example of FIG. 2B, optical cable router 200 is configured to optically connect to two rows of quarter-width modular computing devices. Optical cable router 200 includes upper optical connectors 206 and lower optical connectors 210 spaced across crossbar 202. Plenum attachment points 212 are located on plenum couplers 204a and 204b on either side of crossbar 202. Crossbar lock 214 is located on crossbar 202.

Optical cable router 200 may be affixed between two rows of slots of the modular computing system such that upper optical connectors 206 are positioned to couple with respective optical connectors of modular computing devices retained in the row of slots adjacent to and above crossbar 202 of optical cable router 200. Further, lower optical connectors 210 are positioned to couple with respective optical connectors of modular computing devices retained in the row of slots adjacent to and below crossbar 202 of optical cable router 200.

Plenum attachment points 212 affix optical cable router 200 to rocker-arm plenums of the modular computing system. In some examples, plenum attachment points 212 retain plenum couplers 204a and 204b of optical cable router 200 in a fixed position in relation to the modular computing system. In some other examples, plenum attachment points 212 allow optical cable router 200 to move in a certain manner to allow modular computing devices to be inserted into or removed from adjacent slots. Plenum attachment points 212 may be received into complementary attachment points of the rocker-arm plenums. In some examples, the complementary attachment points are contained within a standard rocker-arm plenum portion. In some other examples, a specialized rocker-arm plenum portion including the complementary attachment points must be used to retain optical cable router 200. In yet other examples, plenum attachment points 212 are received into complementary attachment points of the rack of the modular computing system, and the rocker-arm plenums include a passthrough aperture through which plenum attachment points 212 pass to couple with the complementary attachment points of the rack.

Crossbar lock 214 retains the crossbar 202 (and thus the entirety of optical cable router 200) in a certain position. Although there may be many positions that crossbar 202 can be retained in, there are three categories of positions crossbar lock 208 can retain crossbar 202 in. These positions correspond to the manner in which crossbar 202 moves to allow access to the adjacent modular computing devices. A neutral position is one where both the upper adjacent slots and the lower adjacent slots are blocked by crossbar 202. An upper position is one where only the upper adjacent slots are blocked by crossbar 202. A lower position is one where only the lower adjacent slots are blocked by crossbar 202. In some examples, crossbar lock 214 is partially retained in retention grooves that are located either on the rack or the rocker-arm plenums of the modular computing system.

When crossbar lock 214 is engaged, the portion of crossbar lock 208 retained in retention grooves prevents crossbar 202 from moving from one position to another. When crossbar lock 214 is disengaged, crossbar 202 is free to move from one position to another. In some examples, crossbar lock 214 includes a spring that returns crossbar lock 214 to an engaged position when pressure is not applied on a disengagement tab 216 of crossbar lock 214. In some other examples, crossbar lock 214 moves from an engaged position to a disengaged position when pressure is applied to disengagement tab 216 in one direction, and crossbar lock 214 moves from a disengaged position to an engaged position when pressure is applied to disengagement tab 216 in another direction.

In some examples, application of pressure to disengagement tab 216 of crossbar lock 214 advances crossbar 202 from one position to the next adjacent position. In certain examples, repeated applications of pressure to disengagement tab 216 results in crossbar 202 cycling through positions. In certain other examples, the advancement to the next adjacent position is gravity assisted, and when a certain position is attained, crossbar 202 must be manually reset to another position.

In certain examples, crossbar 202 includes multiple crossbar locks 214. Crossbar locks 214 may be mechanically coupled so that application of pressure to disengagement tab 216 of one crossbar lock 214 moves all crossbar locks 214 from an engaged position to a disengaged position or from a disengaged position to an engaged position. In some other examples, simultaneous coordinated pressure on disengagement tabs 216 of each crossbar lock 214 is required to disengage all crossbar locks 214. In yet other examples, crossbar locks 214 can be sequentially disengaged to allow movement of crossbar 202 and sequentially engaged to retain crossbar 202 in a position.

Alternatively, crossbar lock 214 may be a retention button, a retention switch, or any other appropriate device for toggling between an engaged and a disengaged state for the purpose of retaining the crossbar in a certain position.

In the example of FIG. 2B, optical connectors 206 and 210 are retained in fixed positions relative to crossbar 202. When crossbar 202 is moved relative to the modular computing system, optical connectors 206 and 210 move with crossbar 202. In order to maintain the connection between optical connectors 206 and 210 in this example, the complementary optical connectors of the adjacent modular computing devices must move in relation to their respective modular computing devices. In some other examples, optical connectors 206 and 210 move relative to crossbar 202 so that when crossbar 202 moves, optical connectors 206 and 210 stay fixed in relation to the modular computing system. In such examples, the complementary optical connectors of the adjacent modular computing devices need not move in relation to their respective modular computing devices. In yet other examples, limited flexibility of optical cables may require a limited range of motion of optical connectors 206 and 210 so that they do not stay entirely fixed in relation to the modular computing system, but they also are not fixed in relation to crossbar 202. In other words, optical connectors 206 and 210 only partially move when crossbar 202 moves. In such examples, both optical connectors 206 and 210, as well as the complementary optical connectors of the modular computing devices may partially move, resulting in the sum movement of both optical connectors 206 and 210 and the complementary optical connectors spanning the distance of motion of crossbar 202.

Figure 3:
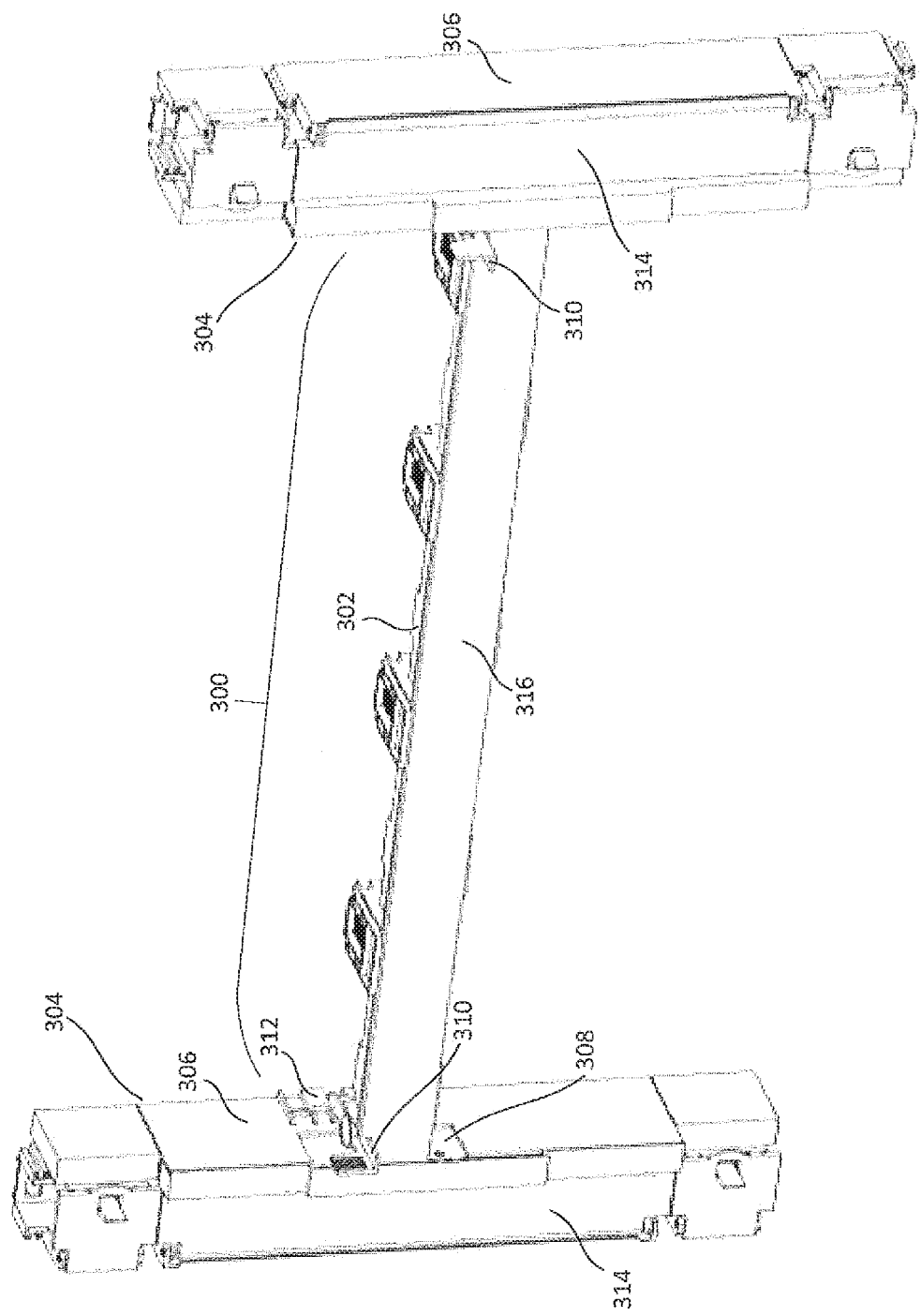
FIG. 3 illustrates an example optical cable router coupled to rocker-arm plenums.

FIG. 3 illustrates an example optical cable router 300 coupled to rocker-arm plenums 304. Optical cable router 300 includes crossbar 302, plenum coupler 308, crossbar lock 310, and access panel 316. Optical cable router 300 is coupled to rocker-arm plenums 304, each of which include a cable router receiver 306, retention grooves 312, and an access panel 314.

For example, optical cable router 300 couples with rocker-arm plenums 304. In certain examples, crossbar 302 spans between rocker-arm plenums 304. Plenum couplers 308 may be received in cable router receivers 306 of rocker-arm plenums 304. In some examples, plenum couplers 308 include plenum attachment points that are received in complementary attachment points in cable router receivers 306. In some examples, cable router receivers 306 are special-purpose components used to receive optical cable router 300. In some other examples, cable router receivers 306 are general-purpose components of rocker-arm plenums 304 used to couple with modular computing devices. In such examples, the general-purpose cable router receivers 306 include attachment points to receive plenum attachment points of plenum couplers 308.

Optical cable router 300 moves relative to the modular computing system to allow adjacent modular computing devices to be inserted into or removed from slots of the modular computing system. In the example of FIG. 3, crossbar 302 slides vertically and is retained in a position by crossbar locks 310, which are received in retention grooves 312 of rocker-arm plenums 304. In the example of FIG. 3, when crossbar 302 slides vertically, plenum couplers 308 also slide vertically within cable router receivers 306. In some examples, cable router receivers 306 include apertures to allow vertical movement of plenum couplers 308 and crossbar 302. In some other examples, plenum couplers 308 change shape to allow crossbar 302 to vertically slide. In yet other examples, crossbar 302 vertically slides relative to plenum couplers 308.

Retention grooves 312 retain optical cable router 300 in a number of different positions. In some examples, retention grooves 312 retain optical cable router 300 in three positions: an upper position wherein bottom adjacent modular computing devices can be inserted and removed, a lower position wherein top adjacent modular computing devices can be inserted and removed, and a neutral position wherein both the bottom and top adjacent modular computing devices are blocked from being inserted and removed. In some other examples, retention grooves 312 retain optical cable router 300 in any number of positions, each of which can be categorized as an upper position, a lower position, or a neutral position.

Rocker-arm plenums 304 and optical cable router 300 work in conjunction to route and organize optical cables on the exterior of the modular computing system. Access panel 316 of optical cable router 300 and access panels 314 of rocker-arm plenums 304 can be opened to expose respective optical cable cavities that retain the optical cables of the modular computing system. In some examples, optical cables can be routed from the computing fabric of the modular computing system to optical connectors of optical cable router 300 through rocker-arm plenums 304 and crossbar 302 of optical cable router 300. In some examples, the movement of optical cable router 300 requires optical cables to flex and move within the optical cable cavities of rocker-arm plenums 304 and optical cable router 300. In some examples, there may be cable management features (not shown) such as cable grooves, cable clamps, cable spools within optical cable router 300 and rocker-arm plenums 304. Once the optical cables are properly routed, access panels 314 and 316 can be closed to conceal the optical cables.

Figure 4:
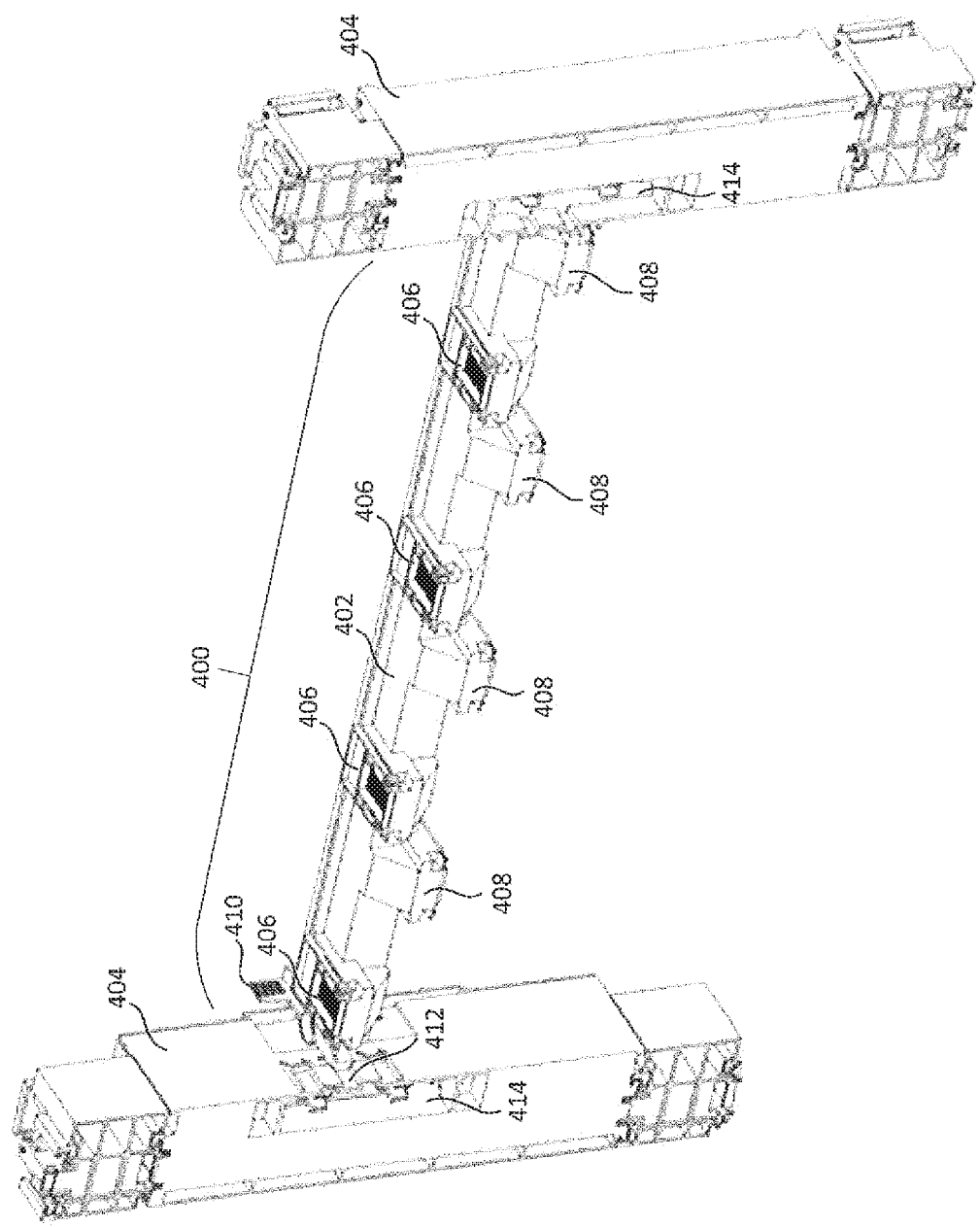
FIG. 4 illustrates another view of an example optical cable router coupled to rocker-arm plenums.

FIG. 4 illustrates an example optical cable router 400 coupled to rocker-arm plenums 404. Optical cable router 400 includes crossbar 402, optical connectors 406 and 408 and crossbar lock 410. Rocker-arm plenums 404 include retention grooves 412 and router apertures 414.

Optical cable router 400 routes optical cables to optical connectors 406 and 408 in an optical cable cavity within crossbar 402. Optical cable router 400 is located between rows of slots that receive quarter-width modular computing devices. Optical connectors 406 couple with complimentary optical connectors of the modular computing devices of the top adjacent row of slots. Optical connectors 408 couple with complimentary optical connectors of the modular computing devices of the bottom adjacent row of slots.

Optical cable router 400 moves to allow access to the adjacent modular computing devices of the top adjacent row of slots and the bottom adjacent row of slots. Crossbar lock 410 retains optical cable router 400 in a position. Crossbar lock 410 is retained in retention grooves 412 that determine the position of optical cable router 400. For example, optical cable router 400 may be in upper positions that allow access to the bottom adjacent row of slots, lower positions that allow access to the top adjacent row of slots, or neutral positions that block both the top and bottom adjacent rows of slots.

In some examples, when optical cable router 400 moves, it causes plenum coupler portions of optical cable router 400 to move within router apertures 414. The plenum coupler portions of optical cable router 400 may change shape within router apertures 414 to facilitate the motion of optical cable router 400. Crossbar 402 may move in relation to the plenum coupler portions, wherein the motion of crossbar 402 is made within router apertures 414.

Figure 5:
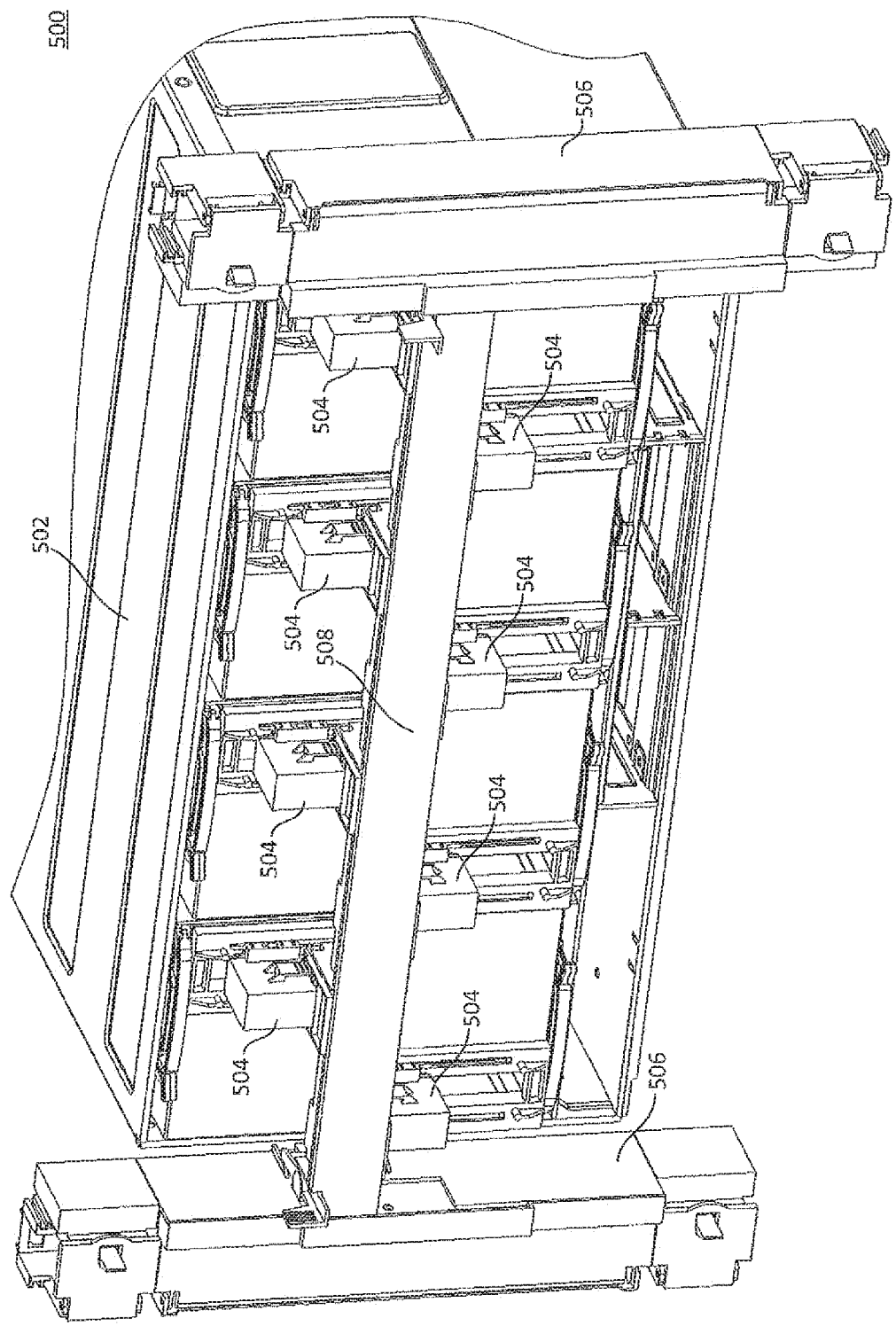
FIG. 5 illustrates an example optical cable router vertically raised to allow access to a bottom row of modular computing device in a modular computing system.

FIG. 5 illustrates an example modular computing system 500. Modular computing system 500 includes a frame 502 that include modular computing devices, each including optical connectors 504. Modular computing system 500 further includes rocker-arm plenums 506 and optical cable router 508.

In some examples, optical cable router 508 moves in relation to frame 502. In the example of FIG. 5, optical cable router 508 slides vertically and being retained in the upper position to allow access to the bottom modular computing devices of frame 502. After optical cable router 508 slides vertically, it may be held in a position by a crossbar lock and retention grooves. Optical connectors of optical cable router 508 are coupled to respective optical connectors 504 of the modular computing devices. In the example of FIG. 5, when optical cable router 508 vertically slides, the optical connectors of optical cable router 508 remain in a fixed position relative to the crossbar of optical cable router 508. In such examples, optical connectors 504 vertically slide in relation to frame 502 to retain the optical connections with the optical connectors of optical cable router 508. In some examples, optical cables within the modular computing devices move and flex as optical connectors 504 vertically slide.

Figure 6:
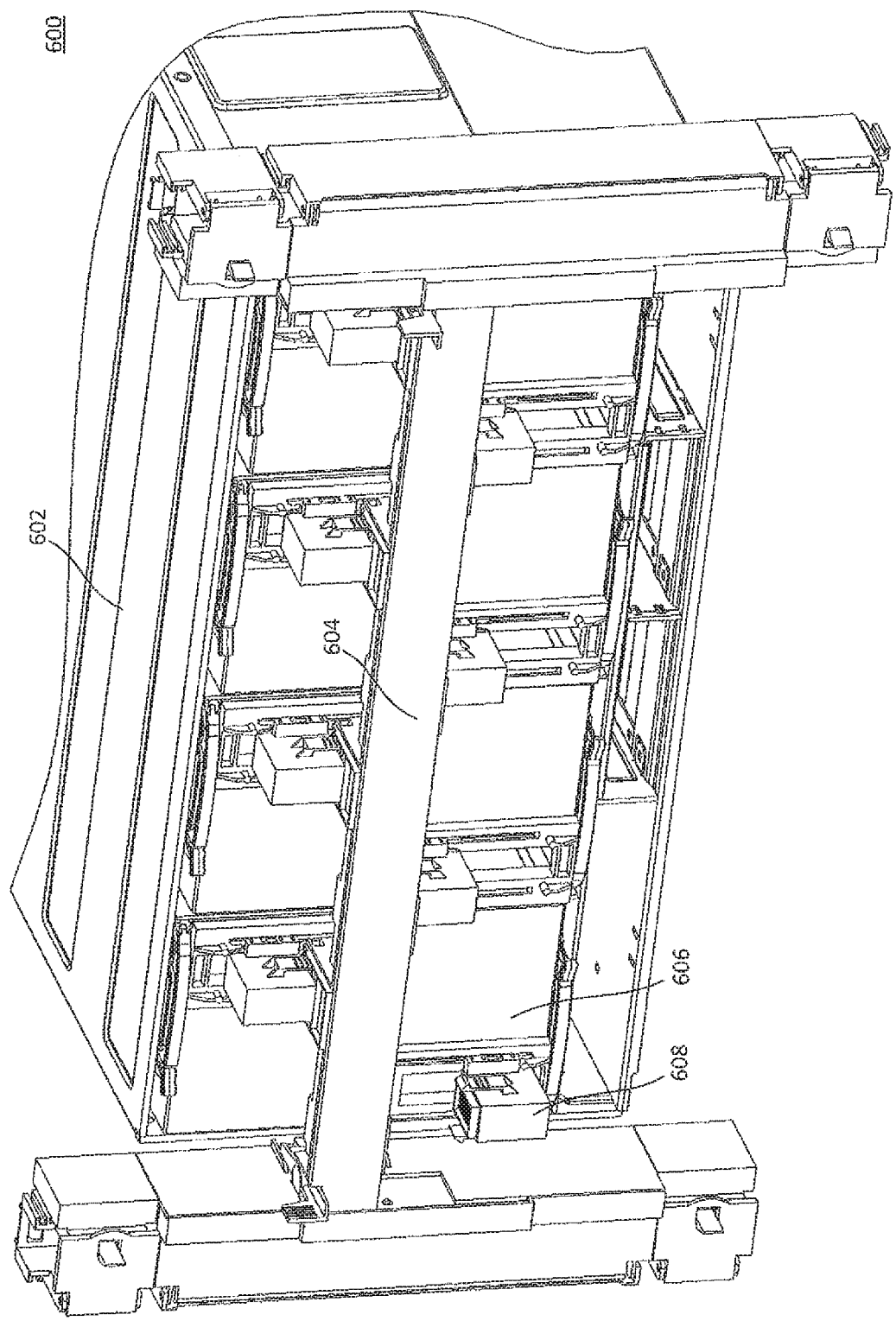
FIG. 6 illustrates an example optical cable router with an optical connector disconnected from a bottom row modular computing device.

FIG. 6 illustrates an example modular computing system 600. Modular computing system 600 includes a frame 602 including a modular computing device 606 which includes an optical connector 608. Modular computing system also includes an optical cable router 604.

In the example of FIG. 6, optical cable router 604 slides vertically to allow access to the modular computing devices of frame 602. After optical cable router 604 slides vertically, it may be held in a position by a crossbar lock and retention grooves. Optical connectors of optical cable router 604 are coupled to respective optical connectors of the modular computing devices. One such optical connector of optical cable router 604 couples to optical connector 608 of modular computing device 606. In the example of FIG. 6, when optical cable router 604 vertically slides to the upper position, the optical connectors of optical cable router 604 remain in a fixed position relative to the crossbar of optical cable router 604. Optical connector 608 of a bottom computing device 606 is disconnected from its respective optical connector of optical cable router 604. In some examples, disconnecting optical connector 608 from its respective optical connector on optical cable router 604 allows the bottom modular computing device 606 to be removed from modular computing system 600 when optical cable router 604 is retained in an upper position. In certain examples (not shown), decoupling optical connector 608 from its respective optical connector of optical cable router 604 includes pivoting the respective optical connector of optical cable router 604 around a lateral axis (e.g., an axis aligned with the length of the crossbar of optical cable router 604).

Figure 7:
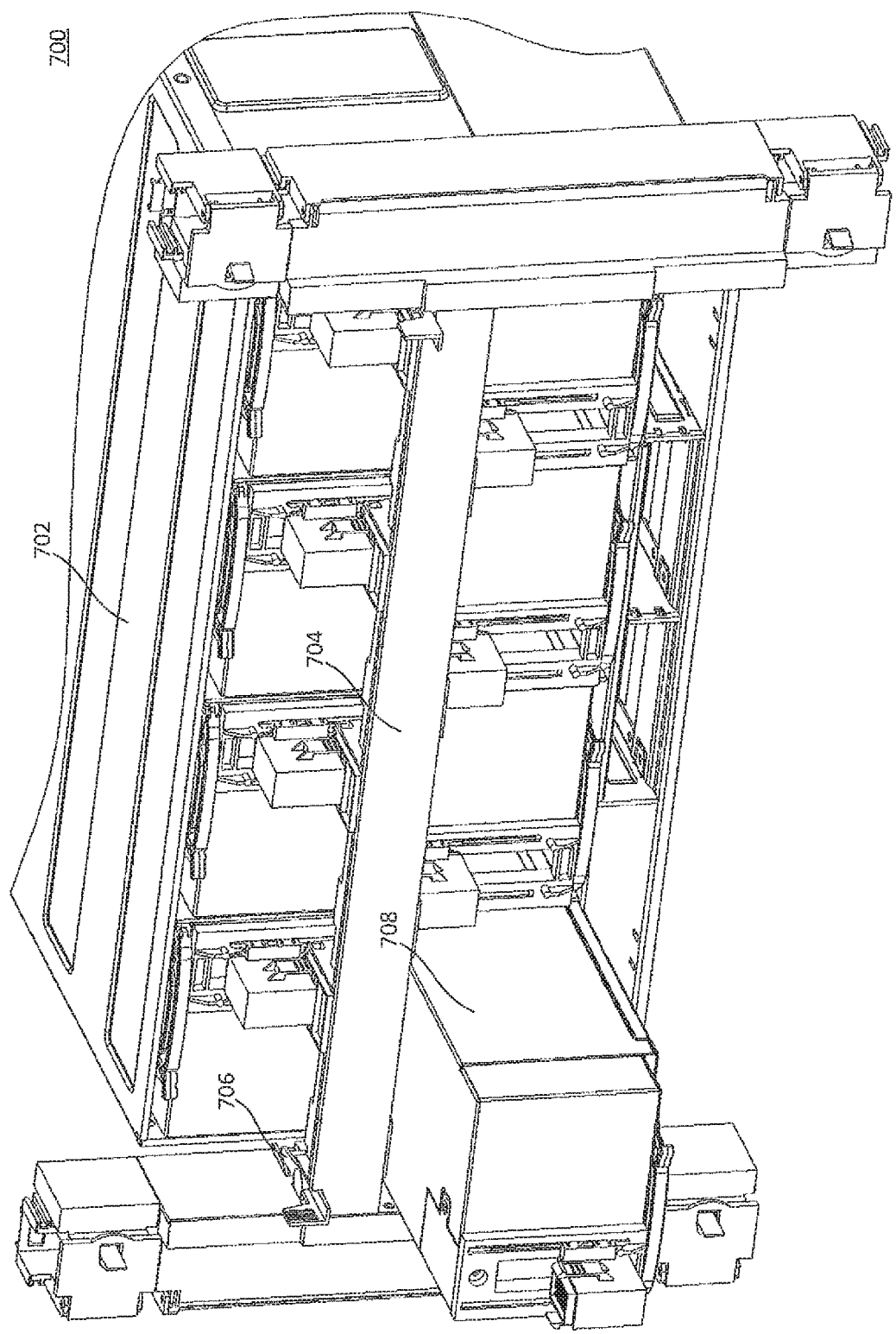
FIG. 7 illustrates an example optical cable router with a bottom row modular computing device removed from the modular computing system.

FIG. 7 illustrates an example modular computing system 700. Modular computing system 700 includes a frame 702 including a modular computing device 708. Modular computing system also includes an optical cable router 704 with retention equipment 706.

In the example of FIG. 7, optical cable router 704 slides vertically and being retained in the upper position to allow access to the bottom modular computing devices of frame 702. After optical cable router 704 slides vertically, it may be held in the upper position by a crossbar lock and retention grooves. Optical connectors of optical cable router 704 are coupled to respective optical connectors of the modular computing devices. One such optical connector of optical cable router 704 couples to the optical connector of the bottom modular computing device 708 to be removed. In the example of FIG. 7, when optical cable router 704 vertically slides, the optical connectors of optical cable router 704 remain in a fixed position relative to the crossbar of optical cable router 704. The optical connector of modular computing device 708 is disconnected from its respective optical connector on optical cable router 704. Since optical cable router 704 is retained in an upper position by crossbar lock 706, modular computing device 708 can be removed from modular computing system 700.

Figure 8:
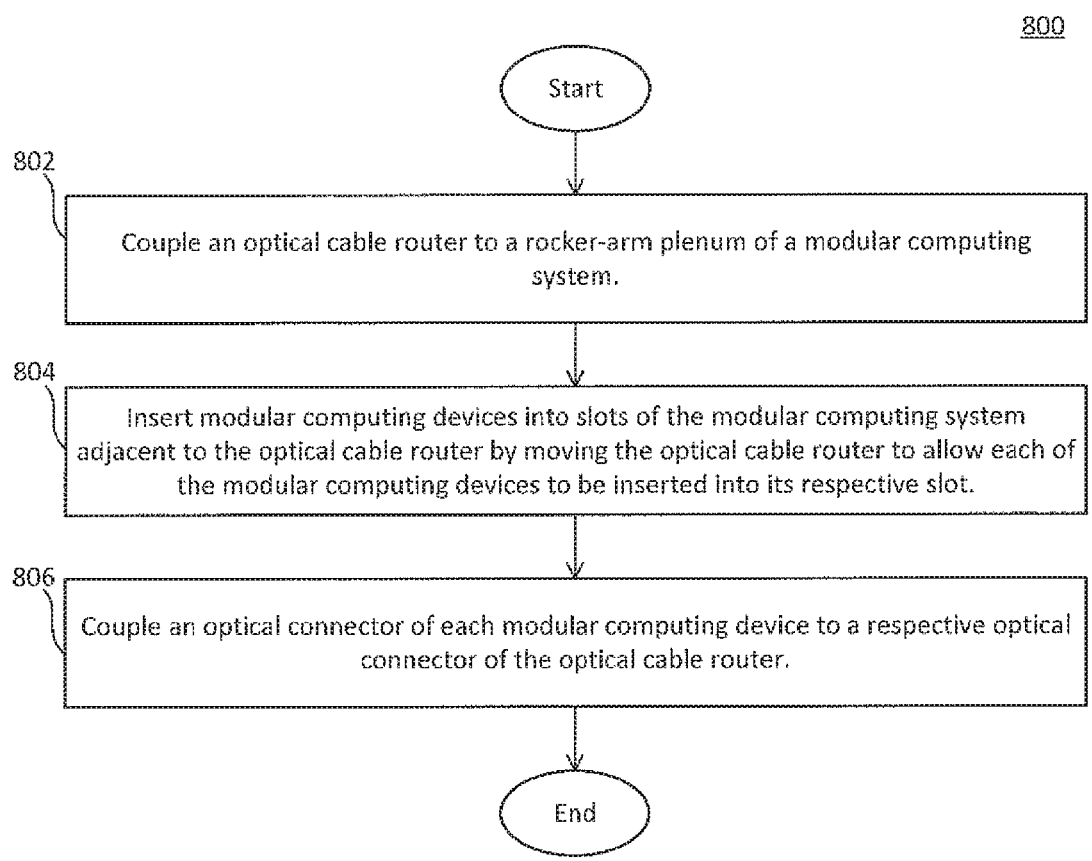
FIG. 8 is a flowchart describing an example method for inserting a modular computing device into a modular computing system.

FIG. 8 is a flowchart illustrating an example method 800 for coupling partial-width modular computing devices to a computing fabric of a modular computing system.

In step 802, an optical cable router is coupled to a rocker-arm plenum of a modular computing system. In some examples, the optical cable router includes a crossbar with an optical cable cavity that includes optical cables and an access panel that covers the optical cable cavity. The optical cable router may include optical connectors for coupling to complementary optical connectors on modular computing devices of the modular computing system.

In certain examples, when the optical cable router is coupled to the rocker-arm plenum, optical cables are routed through the optical cable router and through the rocker-arm plenum to couple the optical cables to a computing fabric of the modular computing system.

In step 804, modular computing devices are inserted into slots of the modular computing system that are adjacent to the optical cable router. This is accomplished by moving the optical cable router in ways that allow each of the modular computing devices to be inserted into its respective slot. In some examples, the slots adjacent to the optical cable router are sized for quarter-width modular computing devices.

Figure 9:
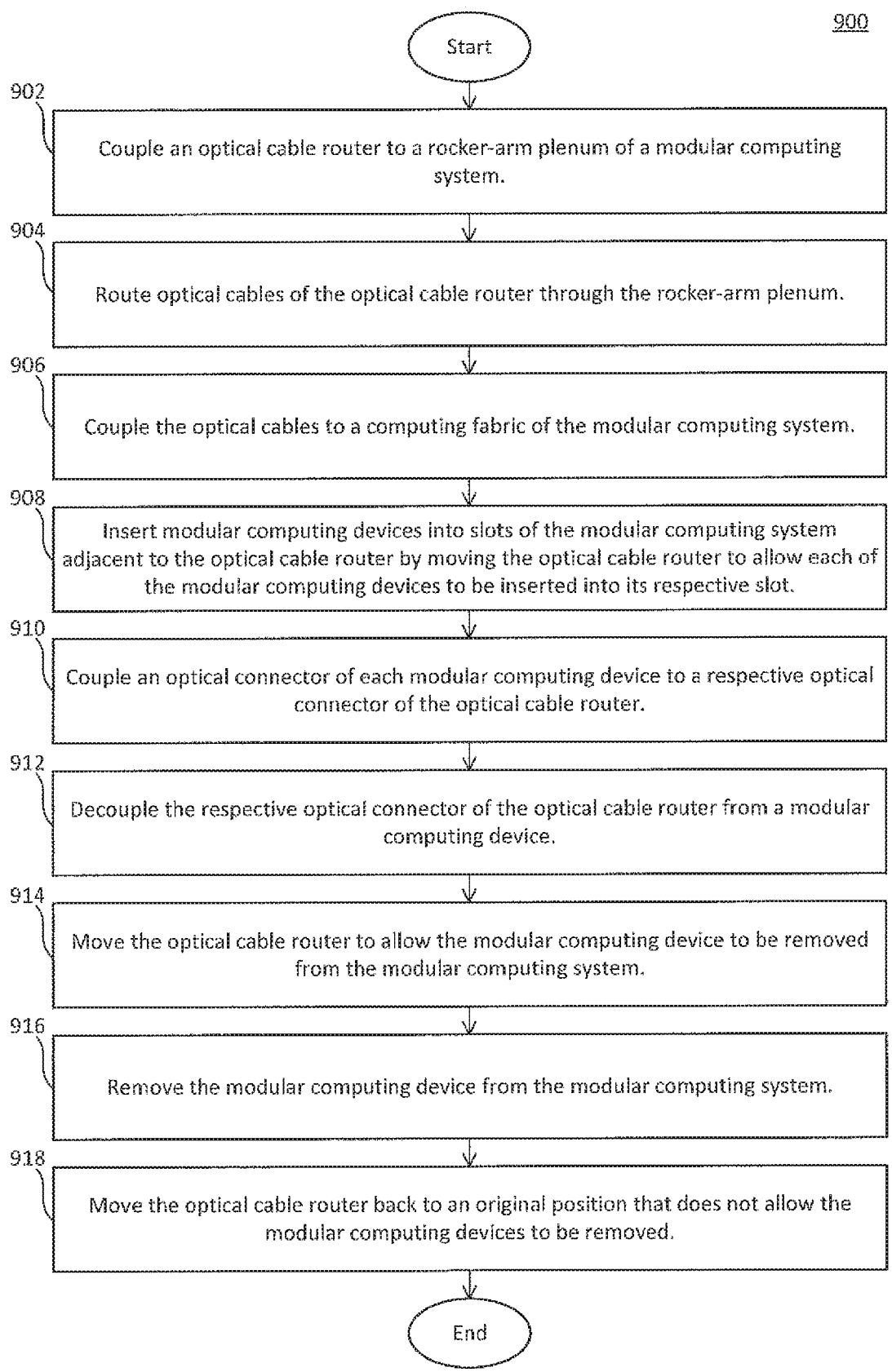
FIG. 9 is a flowchart describing an example method for inserting and removing a modular computing device into a modular computing system.

In step 806, an optical connector of each modular computing device inserted into slots adjacent to the optical cable router is coupled to a respective optical connector of the optical cable router. In some examples, the optical cable router includes upper optical connectors to couple to modular computing devices above and adjacent to the optical cable router. In some other examples, the optical cable router includes lower optical connectors to couple to modular computing devices below and adjacent to the optical cable router. In yet other examples, the optical cable router includes both upper and lower optical connectors, FIG. 9 is a flowchart illustrating an example method 900 for inserting and removing modular computing devices in a modular computing system.

In step 902, an optical cable router is coupled to a rocker-arm plenum of the modular computing system. In some examples, the optical cable router includes a crossbar with an optical cable cavity that includes optical cables and an access panel that covers the optical cable cavity. The optical cable router may include optical connectors for coupling to complementary optical connectors on modular computing devices of the modular computing system.

In step 904, optical cables of the optical cable router are routed through the rocker-arm plenum. In some examples, the optical cable router includes an optical cable cavity that couples with an aperture of the rocker-arm plenum that leads to an optical cable cavity of the rocker-arm plenum. The optical cables connect optical connectors of the optical cable router to a computing fabric of the modular computing system. In some examples, the optical cable cavities of the optical cable router and the rocker-arm plenum include guides to restrict the motion of the optical cables when the optical cable router moves in relation to the rocker-arm plenum.

In step 906, the optical cables are coupled to a computing fabric of the modular computing system. In some examples, computing fabric devices are located in the rack of the modular computing system, and the optical cables connect optical connectors of the optical cable router to optical connectors on the computing fabric devices. In such examples, an optical cable initiates at its respective optical connector of the optical cable router, transits the optical cable cavity of the optical cable router to an aperture in the coupled rocker-arm plenum. The optical cable then passes through the aperture into an optical cable cavity of the rocker-arm plenum. The optical cable may terminate in an optical connector of a rocker arm of the rocker-arm plenum. The optical cable may otherwise terminate in an optical connector of another optical cable router, as appropriate given the design of the computing fabric device.

In step 908, modular computing devices are inserted into slots of the modular computing system adjacent to the optical cable router by moving the optical cable router to allow each of the modular computing devices to be inserted into its respective slot. In some examples, the modular computing system includes frames within a rack. Each frame includes slots arranged in rows. In some examples, each row of slots is a uniform height. Each row of slots can retain one or more modular computing devices. The optical cable router, when in a neutral position blocks adjacent rows of slots, preventing the modular computing devices from being inserted in those adjacent rows of slots. When the optical cable router is moved to an upper or lower position, modular computing devices can be inserted in the bottom or top adjacent row of slots, respectively.

In step 910, an optical connector of each modular computing device is coupled to a respective optical connector of the optical cable router. In some examples, coupling the optical connectors results in the modular computing device being connected to a computing fabric device of the modular computing system.

In step 912, an optical connector of the optical cable router is decoupled from the respective modular computing device. In some examples, the decoupling can initiate removal of the modular computing device from the modular computing system. In certain examples, the optical connector of the optical cable router, upon decoupling, pivots around a lateral axis passing lengthwise through the crossbar of the optical cable router. In certain other examples, an optical connector of the modular computing device slides vertically to decouple from the optical connector of the optical cable router.

In step 914, the optical cable router is moved to allow the modular computing device to be removed from the modular computing system. In some examples, the optical cable router moves in relation to the rocker-arm plenum and in relation to the modular computing system. In some other examples, only portions of the optical cable router move, such as only the crossbar. In yet other examples, some portions (e.g. the crossbar) of the optical cable router move, and other portions (e.g. plenum couplers) change shape to move the optical cable router. Different examples may have different manners of moving the optical cable router to provide access to the modular computing device. Some example manners of motion include vertically sliding the crossbar and pivoting the crossbar around a lateral axis that passes lengthwise through the crossbar.

When the optical cable router moves, the optical connectors that are coupled to modular computing devices retain their coupling with the modular computing devices. In some examples, a complementary optical connector on each modular computing device moves along with the optical cable router to maintain the connection. In some other examples, the optical connectors of the optical cable router move in relation to the crossbar and maintain a fixed position relative to the modular computing device. In yet other examples, both the optical connectors of the optical cable router and the optical connectors of the modular computing devices move partially to, in combination, cover the entire distance the optical cable router has moved. In such examples, the flexibility of the optical cables respectively coupled to each optical connector may not be enough to allow the optical connector to move the entirety of the distance the optical cable router has moved.

In step 916, the modular computing device is removed from the modular computing system. With the optical cable router moved, the modular computing device is not blocked from being removed. The modular computing device may require additional actions (e.g. removing retention apparatus) to be removed from the modular computing system, but the optical cable router no longer impedes removal of the modular computing device.

In step 918, the optical cable router is moved back to an original (e.g. neutral) position that does not allow the modular computing devices to be removed. The optical cable router can be moved to three types of positions, upper, lower, and neutral. When the optical cable router is in the neutral position, none of the adjacent rows of modular computing devices are able to be removed. In some examples, the optical cable router includes a crossbar lock that resides in retention grooves of the rocker-arm plenum to fix the optical cable router in a certain position.

Figure 10:
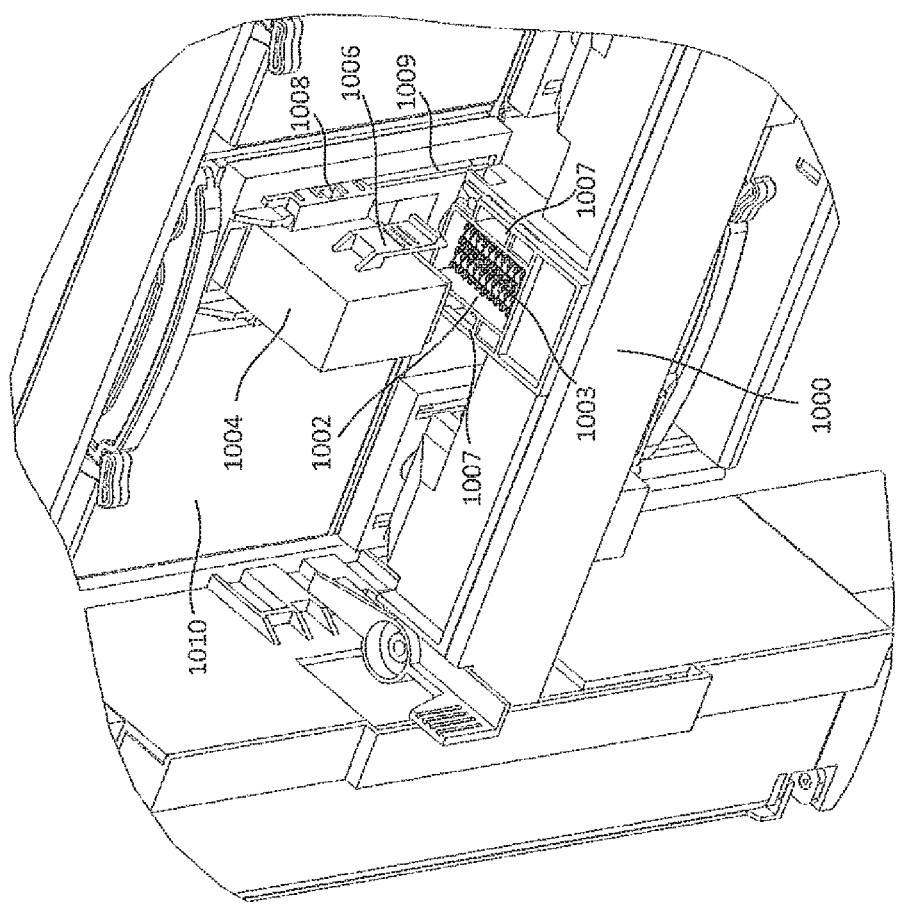
FIG. 10 illustrates an example optical connection between an optical cable router and a modular computing device.

FIG. 10 illustrates an example optical connector 1002 of an example optical cable router 1000. Optical connector 1002 couples with complementary optical connector 1004 of a modular computing device. In some examples, optical connector 1002 includes optical transmission elements 1003 that, when coupled with optical connector 1004, transmit and receive optical signals between optical cable router 1000 and modular computing device 1010. When coupled to optical connector 1002, optical connector 1004 engages retention clips 1006 in complementary retention apertures 1007 of optical connector 1002. Only one of the two complementary retention clips 1006 is visible in FIG. 10. Retention clips 1006 engage with the respective retention apertures 1007 to retain optical connector 1004 of modular computing device 1010 to optical connector 1002 of optical cable router 1000. Retention clips 1006 may be disengaged from their respective retention apertures 1007 by manually squeezing retention clips 1006 and sliding optical connector 1004 along rail 1008 of modular computing device 1010. Although the example of FIG. 10 illustrates retention clips 1006, any appropriate method of retaining the coupling between optical connector 1002 and optical connector 1004 is contemplated. In the example of FIG. 10, optical connector 1004 slides vertically with respect to the modular computing device. Optical connector 1004 includes rail 1008 which slides within a rail aperture 1009 of the modular computing device to allow optical connector 1004 to slide vertically. In some instances, optical connector 1004 slides vertically to maintain its coupling with optical connector 1002 while optical cable router 1000 slides vertically. In some other instances, optical connector 1004 slides vertically to decouple from optical connector 1002.

FIG. 11 illustrate the motion of an optical connector 1102 relative to its modular computing device 1100.

Figure 11A:
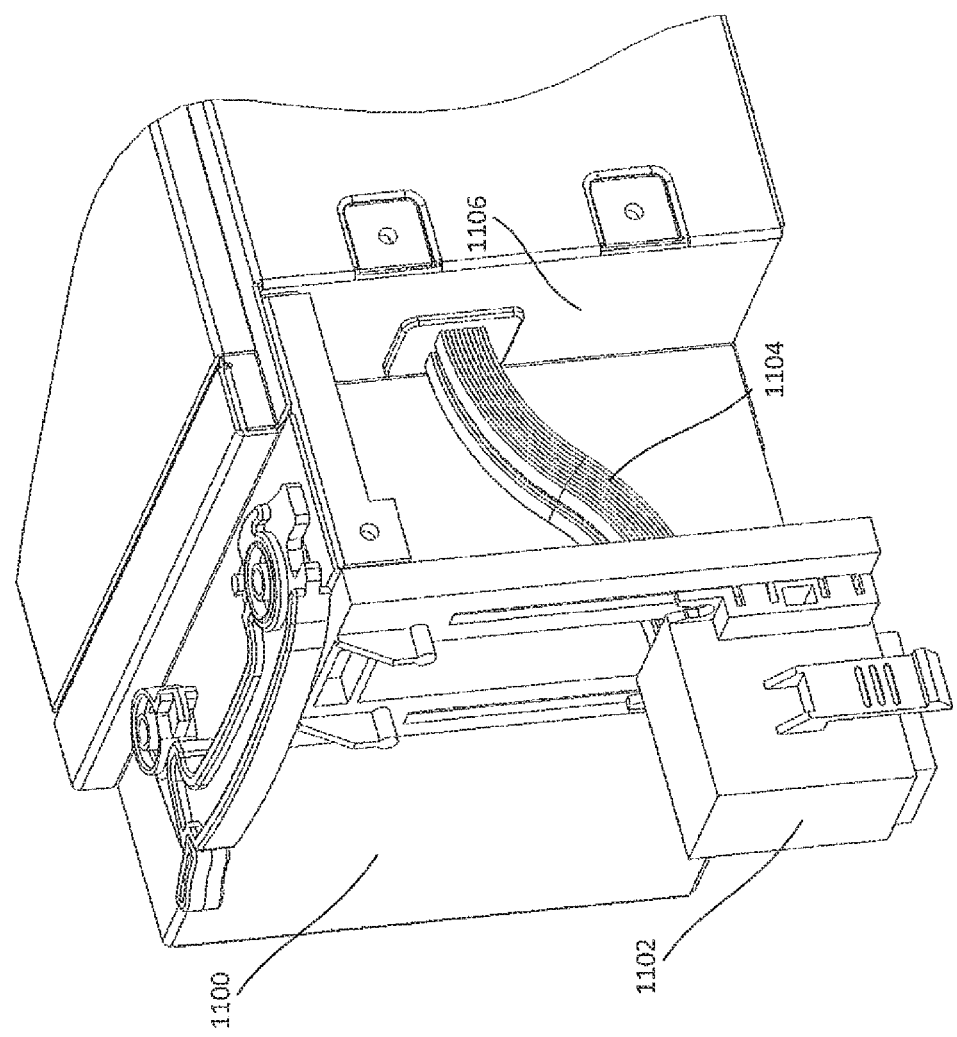
FIGS. 11A-B illustrate an example modular computing device with a slidable optical connector.

FIG. 11A illustrates a modular computing device 1100 with its optical connector 1102 in a lower position. In the example of FIG. 11A, optical connector 1102 slides vertically in relation to modular computing device 1100. During such sliding movement, optical cables 1104 must flex and move to retain the connection between optical connector 1102 and an aperture on inner faceplate 1106. In some examples, inner faceplate 1106, in conjunction with other components of modular computing device 1100, substantially reduces electro-magnetic interference (EMI) and radio frequency interference (RFI) from modular computing device 1100. In certain examples, optical cable 1104 may be protected with an insulation material.

Figure 11B:
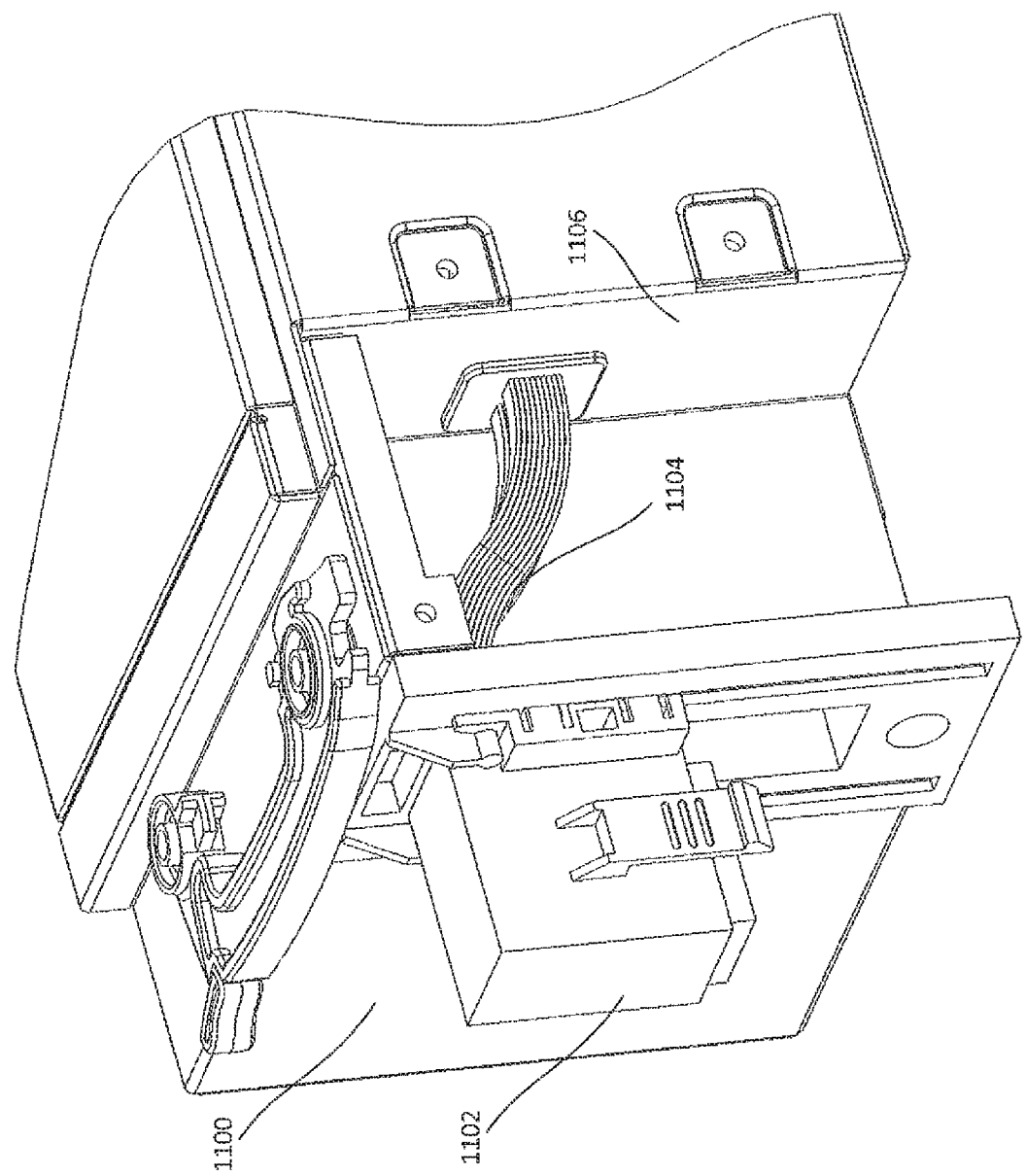

FIG. 11B illustrates modular computing device 1100 with its optical connector 1102 in an upper position. In some instances, optical connector 1102 slides vertically to maintain a coupling with a complementary optical connector of an optical cable router that slides vertically. In some other instances, optical connector 1102 slides vertically to decouple from the complementary optical connector of the optical cable router. When optical connector 1102 slides vertically, optical cables 1104 flex and move to maintain the connection between optical connector 1102 and an aperture in firewall 1106. In some examples, guides within modular computing device 1100 direct the motion of optical cables 1104. In certain examples, the motion of optical connector 1102 from the lower position to the upper position is less distance that the motion of the optical cable router. In such examples, the complementary optical connector of the optical cable router may move in relation to the optical cable router in order to maintain the coupling with optical connector 1102.

Although the present disclosure describes example components in relation to optical connections and optical cables, this disclosure contemplates examples using electrical or any other appropriate data transmission medium.

Although the present disclosure has been described in detail, it should be understood that various changes, substitutions and alterations can be made without departing from the spirit and scope of the disclosure. Any use of the words "may" or "can" in respect to features of the disclosure indicates that certain embodiments include the feature and certain other embodiments do not include the feature, as is appropriate given the context. Any use of the words "or" and "and" in respect to features of the disclosure indicates that embodiments can contain any combination of the listed features, as is appropriate given the context.

Phrases and parentheticals beginning with "e.g." are used to provide examples merely for the purpose of clarity. It is not intended that the disclosure be limited by the examples provided in these phrases and parentheticals. The scope and understanding of this disclosure may include certain examples that are not disclosed in such phrases and parentheticals.

The invention claimed is:

1. An optical cable router to couple to rocker-arm plenums of a modular computing system, comprising:
   a crossbar including an optical cable cavity and an access panel, the optical cable cavity to receive optical cables;
   plenum couplers to couple the crossbar to the rocker-arm plenums, wherein the crossbar is slideable in relation to the rocker-arm plenums between a plurality of positions;
   a plurality of router optical connectors on the crossbar, wherein the plurality of router optical connectors are to connect to the optical cables, and to mate with respective device optical connectors of corresponding modular computing devices the modular computing system; and
   a crossbar lock to selectively disengage to allow sliding of the crossbar in relation to the rocker-arm plenums, and selectively engage to retain the crossbar at a position of the plurality of positions, wherein the crossbar is moveable from a first position to a second position, the crossbar, when in the first position, to allow insertion and removal of a modular computing device located above the crossbar and with respect to the modular computing system, and the crossbar, when in the second position, to allow insertion or removal of another modular computing device located below the crossbar and with respect to the modular computing system.

2. The optical cable router of claim 1, wherein the crossbar is vertically slideable in relation to the rocker-arm plenums.

3. The optical cable router of claim 2, wherein upon vertically sliding the crossbar, the plurality of router optical connectors retain fixed positions relative to the crossbar and each respective device optical connector of each respective modular computing device vertically slides relative to the respective modular computing device.

4. The optical cable router of claim 1, wherein the plenum couplers are attached to the crossbar, and the plenum couplers are slideable with respect to the rocker-arm plenums to allow sliding movement of the crossbar in relation to the rocker-arm plenums.

5. The optical cable router of claim 4, wherein the plenum couplers are slideable within apertures of the rocker-arm plenums.

6. The optical cable router of claim 1, wherein the plurality of router optical connectors on the crossbar are to mate with the respective device optical connectors that are slideable with respect to the corresponding modular computing devices as the crossbar slides in relation to the rocker-arm plenums.

7. A system comprising:
   a rack including slots to retain modular computing devices;
   a rocker-arm plenum coupled to a rear edge of the rack;
   an optical cable router coupled orthogonally to the rocker-arm plenum, wherein the optical cable router is adjacent to and below a first slot of the rack and adjacent to and above a second slot of the rack, wherein the optical cable router comprises a crossbar; and
   a crossbar lock, wherein when the crossbar lock is disengaged, the crossbar is slideable in relation to the rocker-arm plenum between a first position and a second position, the crossbar, when in the first position, to allow insertion and removal of a modular computing device in the first slot and block insertion and removal of another modular computing device in the second slot, and the crossbar, when in the second position, to allow insertion or removal of the another modular computing device in the second slot and block insertion and removal of the modular computing device in the first slot, and wherein the optical cable router comprises a router optical connector to mate with a device optical connector of the modular computing device in the first slot.

8. The system of claim 7, wherein the sliding of the optical cable router does not disconnect any optical connection of the optical cable router.

9. The system of claim 7, wherein the crossbar lock when engaged retains the optical cable coupler at a position of the first and second positions.

10. The system of claim 9, wherein the crossbar lock comprises a disengagement member to which pressure is applied to disengage the crossbar lock.

11. The system of claim 7, wherein the router optical connector is to mate with the device optical connector that is slideable with respect to the modular computing device as the optical cable router slides in relation to the rocker-arm plenum.

* * * * *